(12) United States Patent
Sutter et al.

(10) Patent No.: US 7,496,889 B2
(45) Date of Patent: Feb. 24, 2009

(54) WHITESPACE KEYWORDS

(75) Inventors: Herbert P Sutter, Bellevue, WA (US);
Jeffrey J Peil, Redmond, WA (US);
Brandon R Bray, Redmond, WA (US);
Mark L Hall, Redmond, WA (US);
Jonathan E Caves, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 489 days.

(21) Appl. No.: 10/972,105

(22) Filed: Oct. 22, 2004

(65) Prior Publication Data

US 2006/0089942 A1   Apr. 27, 2006

(51) Int. Cl.
G06F 9/44 (2006.01)
G06F 9/45 (2006.01)
(52) U.S. Cl. ..................... 717/106; 717/141
(58) Field of Classification Search ............... 717/106, 717/141
See application file for complete search history.

(56) References Cited

U.S. PATENT DOCUMENTS

2002/0129341 A1* 9/2002 Hibdon ............... 717/136
2005/0097514 A1* 5/2005 Nuss .................. 717/114

OTHER PUBLICATIONS

Jennifer Hamilton, "Language integration in the common language runtime", Feb. 2003, ACM SIGPLAN vol. 38, Issue 2.*

DaChuan Yu, "Formalization of generics for the .NET common language runtime", Jan. 2004, ACM SIGPLAN Notices, Proceedings of the 31st ACM SIGPLAN-SIGACT symposium on Principles of Programming Languages POPL '04.*

Jeff Cogswell, "C++ All-In-One desk reference for Dummies", 2003, Wiley Publishing, Inc.*

Tim Wagner et al., "Modeling User-Provided Whitespace and Comments in an Incremental SDE", Mar. 1988.*

Clark Nelson, "Changes from the C++ preprocessor description", pp. 1-4, Jul. 29, 2004, http://www.open-std.org/JTC1/SC22/WG14/www/docs/n1068.htm.*

Fraser et al., "A Retargetable Compiler for ANSI C", ACM SIGPLAN Notices Oct. 26, 1991, pp. 29-43.*

C++/CLI, Language Specification, Working Draft 1.7, Sep. 2004, Publication Time: Jun. 8, 2004 10:16 PM, 200 pages.

* cited by examiner

*Primary Examiner*—Wei Y Zhen
*Assistant Examiner*—Chih-Ching Chow
(74) *Attorney, Agent, or Firm*—Amin, Turocy & Calvin, LLP

(57) ABSTRACT

The present invention provides a system and/or method that facilitates expanding keywords within an existing computer programming language by employing a whitespace keyword containing embedded whitespace. A whitespace component can receive code, and create a whitespace keyword based at least upon a successive comparison of adjacent tokens. The whitespace component creates a whitespace keyword by replacing more than one token with a single token containing embedded whitespace. Moreover, the whitespace component can utilize a lexical analyzer to group code into tokens and a parser component to parse the code.

21 Claims, 9 Drawing Sheets

WHITESPACE KEYWORDS

TECHNICAL FIELD

The present invention generally relates to computer systems, and more particularly to a system and method to enable communications between one or more computer programming languages, wherein creating new keywords to an existing language is facilitated.

BACKGROUND OF THE INVENTION

As computer science has evolved, object oriented programming has become one of many familiar models designers and programmers utilize to implement functionality within computer systems. The object model generally is defined by a class structure that includes class members providing both methods and associated data elements belonging to the class. The class members thus provide/define desired functionality within a computer program, wherein an object is declared as an instance of a particular class. As is commonplace, objects often must exchange data and/or invoke other objects operating on the same platform and/or communicate with objects belonging to remote platforms. In order to communicate between objects, interface systems and standards have been developed to define how objects may communicate and/or interact with one another.

A familiar system for communicating and interfacing between objects is known as the Component Object Model (COM), wherein another similar system is referred to as the Common Object Request Brokers Architecture (CORBA). Still yet other communication interfaces may be defined in languages such as JAVA within an operating framework of a Java Virtual Machine, for example. As these and other systems have been developed however, two common object architectures or models generally have emerged and may generally be defined in terms of managed and unmanaged object systems, for example.

Managed objects may be allocated from a heap within a managed software or execution environment and are generally not responsible for managing associated object lifetimes. Managed objects may be described in terms of a data type (e.g., metadata) and automatically collected (e.g., reclaimed) by a managed environment "garbage collector" that removes the object from memory when the object is no longer being accessed. In contrast, unmanaged objects may be allocated from a standard operating system heap, wherein the object itself is responsible for freeing memory it employs when references to the object no longer exist. This may be accomplished through well-known techniques such as reference counting, for example.

As described above, managed objects may be allocated from a managed heap and automatically garbage collected. In order to achieve this, references to managed objects are traced. In one example, reference counting can be used wherein a last reference to an object is removed, the garbage collector reclaims the memory occupied by the object mitigating the need to reference count managed objects. Yet in a Common Language Runtime (CLR), memory is not reclaimed until a garbage collector is run (e.g., which normally happens with a triggering of low resource conditions). Thus in general, a managed environment essentially handles garbage collection internally. Tracing is possible within managed code because the managed environment keeps track of outstanding references that exist on an object. As each new object reference is declared within managed code, the managed environment adds the reference to a list (e.g., building the list on the fly). At any given time, the managed environment, rather than the object itself, is thus aware of live references that exist on a given object. As references fall out of scope or change value, the list (built on the fly) is determined by knowing a combination of stack walking and how to inspect areas of memory owned by the garbage collector, and as long as a reference remains within managed code, the managed environment is able to trace it. Unfortunately, object references originating from unmanaged code present difficulties when interacting with a managed environment.

One difficulty associated with unmanaged references operating in a managed environment relates to that there is substantially no straightforward way for managed environments to trace references from unmanaged code to managed objects. Even if the managed environment were aware of these references, generally, no information is maintained indicating whether a reference is active or inactive. Thus, since unmanaged clients, for example, are written in unmanaged code, presently, there is not a process for tracing references that unmanaged objects may hold on managed objects executing within a managed environment. Similarly, originating calls from managed environments to unmanaged environments also presents problems relating to managing object lifetimes. For example, some unmanaged objects expect to be reference counted, but in a managed environment reference counting is not required for managed objects. It would thus be very confusing if developers that design managed code had to handle references to managed and unmanaged objects differently.

Along with object lifetime management problems described above, managed and unmanaged object systems generally differ in many other significant ways. These differences may include how the object systems provide object interfaces within the respective object systems, how data is structured and/or defined, and how errors and exceptions are handled, for example. Due to these and other differences between managed and unmanaged object systems, it is presently difficult, time consuming, and expensive in terms of development costs to have objects from an unmanaged system interface and interact with objects from a managed system and visa versa. Moreover, it is generally difficult for managed objects designed according to one object system framework to communicate with objects from an architecturally different managed system framework. This also applies to unmanaged object communications between diverse unmanaged system frameworks. Thus, programmers and developers have diverged based at least in part upon programming preferences relating to a managed or an unmanaged system (e.g., type instantiation in memory areas, garbage collection, pointing and reference to types, . . . ).

A classic paradigm relating to managed and unmanaged systems originates from a programming standpoint. Dependent upon a programmer, program language decisions differ based at least in part upon strengths and weaknesses of the language. Therefore, a programmer must take both benefits and detriments when choosing to program between a managed system and unmanaged system. Common Language Runtime (CLR) and C++ Standard are examples of a managed and unmanaged systems respectively, wherein each system delivers tailored benefits and detriments to the individual programmer. Thus, programmers have diverged based upon programming preferences (e.g., type instantiation in memory areas, garbage collection, pointing and reference to types . . . ) in relation to managed systems or unmanaged systems.

In particular, an unmanaged system allows a programmer to have leniency not available in a managed system such as freedom with type instantiation in memory areas; yet does not provide the benefit of garbage collection. For example, a C++ program provides distinction between definition of a type and how or where the type can be instantiated (e.g., producing a particular object from its class template, which can include allocation of a structure with the types specified by the template, and initialization of instance variables with either default values or those provided by a class constructor function). Thus, a C++ environment provides users with certain idioms that control where or where not a type is instantiated, but a definition of type itself does not control instantiation.

On the other hand, various compilers and other tools expose a managed system's functionality that enable designers to write code that benefits from a managed execution environment. Thus, code that is developed with a language compiler that targets a managed system such as, for example, a Common Language Runtime (CLR) is referred to as managed code. This type environment employs features such as, for example, garbage collection based on type, and caps (e.g., handles) to reference whole objects.

Managed and unmanaged systems such as, for example, C++ Standard and Common Language Runtime (CLR), have developed a divergence in programming preference based upon their individual strengths and weakness. Supporting the C++ Standard within the Common Language Runtime (CLR) unearthed various problems with compatibility and the existing standard. Extending the language became problematic and cumbersome. For example, programmers adopted the use of a double underscore in order to preface keywords for managed extensions to define, such as, garbage-collection classes and properties. Such characteristics, although conformed to C++ Standard, deterred programmers from managed systems based at least in part upon readability of code, comprehension, and a large learning curve.

In view of the above, there is a need to build upon the existing C++ Standard in order to improve upon performance utilizing Common Language Runtime (CLR). More particularly, there is a need to conform to C++ Standard within the Common Language Runtime (CLR) that is readable, yet does not interfere with existing code standards.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that facilitate expanding keywords within an existing programming language by employing whitespace keywords containing an embedded whitespace. By utilizing whitespace keywords, the subject invention mitigates complications involved with selecting identifiers. For example, C++ Standard can be expanding within Common Language Runtime (CLR) by employing whitespace keywords. A whitespace keyword is a single token containing embedded whitespace by a lexer. Thus, programs having a type, variable or namespace identical to an adjacent token are entirely unaffected.

In accordance with one aspect of the subject invention, a system is provided that employs a whitespace component to facilitate expanding an existing computer programming language by utilizing a whitespace keyword. The whitespace component can receive a code and successively compare tokens. Based at least upon the successive comparison, the whitespace component creates a whitespace keyword replacing adjacent tokens in a translation unit and each macro replacement-list. The whitespace component successively compares all of the tokens within a code in order to facilitate expanding an existing programming language (e.g., C++ Standard) within an expansion computer programming language (e.g., Common Language Runtime (CLR)).

In accordance with another aspect of the subject invention, the whitespace component creates whitespace keywords containing an embedded whitespace, wherein the embedded whitespace can be a space (e.g., designated by :)) and/or a comment within an existing programming code. In one aspect in accordance with the subject invention, comments are made within C++ Standard designated by /* and ending with */. The whitespace component interprets such comments as a single space, providing a whitespace keyword based upon a comparison of tokens.

In yet another aspect of the subject invention, a lexical analyzer provides grouping of a code into tokens. The lexical analyzer facilitates creating whitespace keywords by allowing the whitespace component to successively compare adjacent tokens within a code. Furthermore, a parser component that parses the code and generated tokens.

In another aspect of the subject invention, a method provides the creation of a whitespace keyword based at least upon a successive comparison of adjacent tokens facilitating the expansion of C++ Standard code within Common Language Runtime (CLR). The method expands upon translation phase 4 of C++ Standard, wherein each pair of adjacent tokens is successively compared. Based at least in part upon the comparison, a single token containing embedded whitespace is replaced in a translation unit and each macro replacement-list.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

Figure 1:
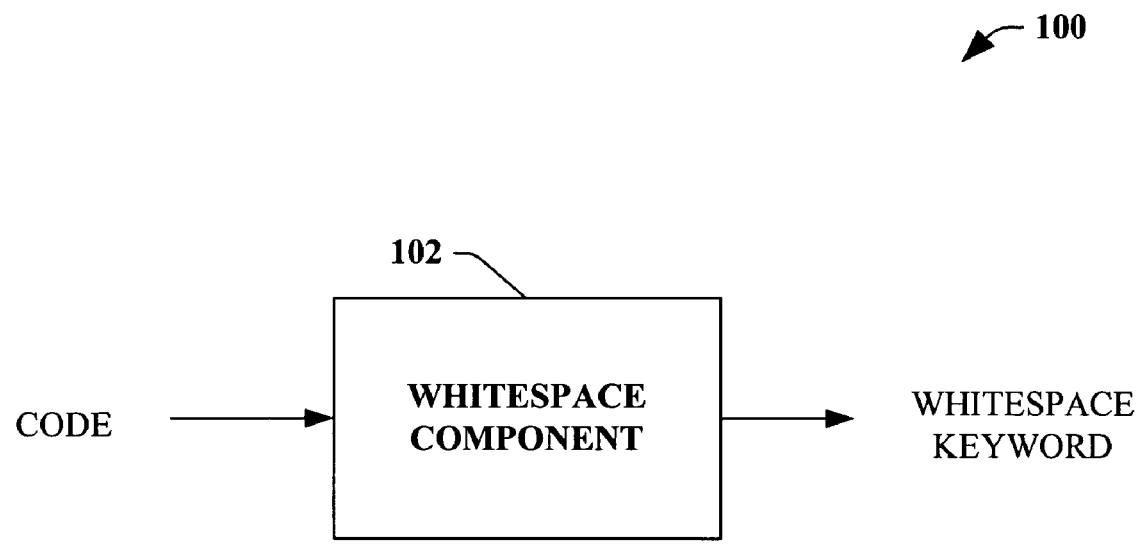
FIG. 1 illustrates a block diagram of an exemplary system that facilitates expanding an existing programming language in accordance with the subject invention.

The present invention relates to systems and methods that facilitate dynamic programming language execution in a managed code environment. A runtime code generator is provided within the framework of a managed object environment. The code generator includes a class allocator that reserves one or more method slots for a dynamic method call. A dynamic method builder then employs the method slots to generate an intermediate language stream that forms a method description. The method description is then fed to a Just-In-Time (JIT) compiler that returns at least one dynamically generated pointer to facilitate execution of the dynamic method call at runtime. A set of application programming interfaces (APIs) are provided to give users a managed "hook" or entry point into the compiler and associated managed execution environment, wherein various other applications for dynamically generated pointers are also supported. By using runtime-code generation, dynamic calls can be compiled at runtime, and if so desired in combination with memorization, the cost of dynamic code can be brought down close to that of ordinary method calls.

As used in this application, the terms "component," "class," "allocator," "system," "builder," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as described herein. The present invention can employ various inference schemes and/or techniques in connection with the present invention. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

The present invention is described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a system 100 that facilitates expanding keywords within an existing computer programming language by employing whitespace keywords. Building upon an existing computer programming language can be difficult based at least upon existing languages having predefined words with special meaning. This disallows using such predefined words in expanding languages. A keyword is a predefined identifier that has special meaning and cannot be used as identifiers in a program and/or code. However, a whitespace keyword (e.g., a single lexical keyword) is a keyword with at least an embedded whitespace within characters. It is to be appreciated that a whitespace is designated with ░. It is to be further appreciated a whitespace is a space and/or comments within a computer programming code. For example, comments can be inserted in C++ Standard after /* and before */ within code facilitating comprehension.

A whitespace component 102 receives code, wherein such code is utilized in order to create a whitespace keyword. With the creation and use of whitespace keywords, an existing computer program language is not disturbed since a majority of languages cannot create identifiers containing whitespace characters. The whitespace component 102 creates whitespace keywords from computer programming code by successively determining whether adjacent tokens are a keyword. If adjacent tokens are a keyword, the whitespace component 102 replaces the adjacent tokens with a single token containing embedded whitespace.

For example, a C++ Standard code can be expanded with Common Language Runtime (CLR). The written code can contain "ref class." The whitespace component 102 receives the code and determines whether adjacent tokens together (e.g., "ref░class") are a keyword for a Common Language Runtime (CLR). Once determined, adjacent tokens are replaced by a single whitespace keyword (e.g., single lexical word). Thus, "ref░class" would be a single token interpreted by a lexer, and programs that have a type, variable, or namespace named "ref" are entirely unaffected. It is to be appreciated whitespace component 102 creates whitespace keywords for the entirety of the received code based at least in part upon a comparison of adjacent tokens.

In one aspect in accordance with the subject invention, the whitespace component 102 facilitates expanding C++ Standard to Common Language Runtime (CLR). Code to be compiled is processed in conceptual steps called phases of translation. In particular, the whitespace component 102 extends translation phase 4, wherein adjacent tokens are utilized in order to create whitespace keywords. For example, the whitespace component can successively consider a first token and a second token (token1 and token2 respectively) within a received code. If the whitespace component 102 determines "token1░token2" is a keyword for the Common Language Runtime (CLR), the individual tokens (e.g., token1 and token2) are replaced with a single whitespace keyword "token1░token2". Therefore, the single whitespace keyword is a single token read by the lexer during phases of translation, wherein programs having a type, variable, and/or namespace named token1 are entirely unaffected.

The whitespace component 102 facilitates expanding a code programming language by employing at least a whitespace keyword containing embedded whitespace. For example, the whitespace component 102 can receive a C++ Standard code, wherein whitespace keywords can be created to be utilized in Common Language Runtime (CLR). Based upon the C++ Standard language and Common Language Runtime (CLR), the whitespace component 102 can create whitespace keywords. For example, the whitespace component 102 can create whitespace keywords for the following: for each, enum class, interface class, ref class, value class, enum struct, interface struct, ref struct, and value struct. Continuing with an example above, a C++ Standard code can contain "for each." The whitespace component 102 receives code, and compares adjacent tokens. In this example, assume "for" is token1 and "each" is token2. As stated supra, if token1 token2 is a keyword, the tokens are replaced by a single token. The whitespace component 102 determines "for each" is a keyword within Common Language Runtime (CLR). Thus, two tokens would be replaced by a single token, namely, a whitespace keyword.

It is to be appreciated that the whitespace component 102 can create whitespace keywords from two adjacent tokens which can be two identifiers and/or an identifier and an existing keyword. Creating a whitespace keyword from two identifiers and/or an identifier and an existing keyword provide versatility and convenience when building upon an existing computer programming language. For example, the whitespace component 102 creates keywords with embedded whitespace wherein a program cannot create identifiers with whitespace characters. In other words, problems and conflicts surrounding the choice of keywords are mitigated by utilizing the whitespace component 102.

Figure 2:
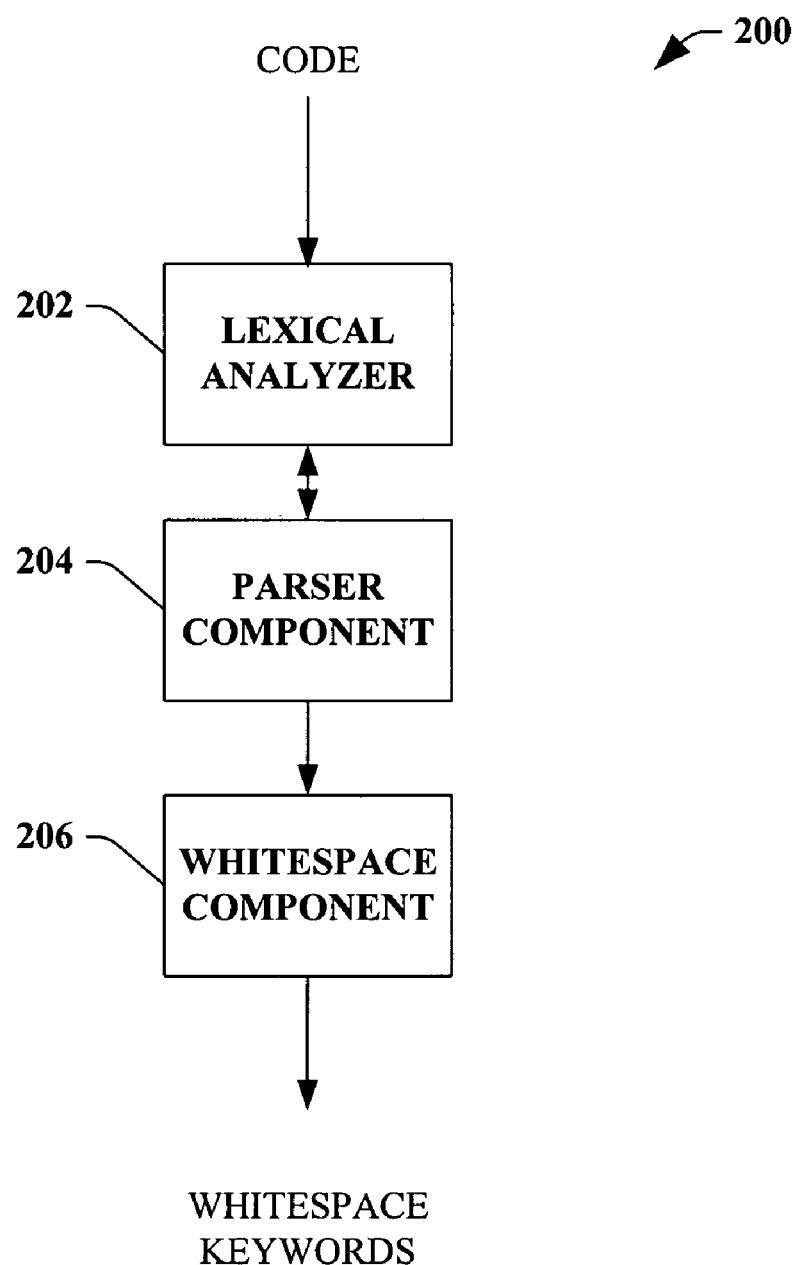
FIG. 2 illustrates a block diagram of a system that facilitates expanding an existing programming language in accordance with the subject invention.

Now turning to FIG. 2, a system 200 is illustrated that facilitates expansion of keywords within an existing computer programming language (e.g., C++ Standard) by employing whitespace keywords. A lexical analyzer 202 receives a code (e.g., C++ Standard), wherein lexical analysis takes place. The lexical analyzer 202 (e.g., lexer) considers the code as a unique sequence of characters that are read and grouped into tokens (e.g., lexical units with a collective meaning). Once the lexical analyzer 202 groups the code into tokens, a parse component 204 parses and stores the code allowing a whitespace component 206 to create whitespace keywords. The parse component 204 can parse the code utilizing techniques such as, but not limited to, top-down parsing, bottom-up parsing, operator-procedure parsing, and/or left-right parsing.

For example, the lexical analyzer can use Deterministic Finite Automata (DFA's) to match tokens found on a character input stream. DFA's can be defined by a set of regular expressions in a source code and created at runtime. It is to be appreciated that more than one automaton (e.g., lexical class, lexical tree, ... ) can be defined. Moreover, an action attached to a regular expression can switch from one lexical class to another.

After the code has been grouped into tokens and parsed, the whitespace component 206 successively compares adjacent tokens in order to create a whitespace keyword. If the adjacent tokens are a keyword, the tokens are replaced by a single token with an embedded whitespace, creating a whitespace keyword. It is to be appreciated the whitespace component 206 analyzes the entire code including all adjacent tokens therewith.

In one aspect in accordance with the subject invention, the whitespace component 206 creates whitespace keywords utilizing the parsed and token generated code. The whitespace component 206 creates a whitespace keyword containing embedded whitespace. It is to be appreciated that designates a whitespace. Furthermore, the whitespace considered by the subject invention can be a space (e.g., a space bar) and/or comments within code. For example, comments within C++ Standard are designated by a /* and ending with a */. For example, the following line of code can be written:

interface*/ this is a comment within a C++ Standard code*/ class;

The comment within */ and */ will be read as a whitespace ( ). Thus, the whitespace component 206 replaces token "interface" and token "class" with the single token "interface class" because it is a keyword. In other words, regardless of the amount of comments between two tokens, the whitespace component 206 can treat the comments as a single whitespace.

Figure 3:
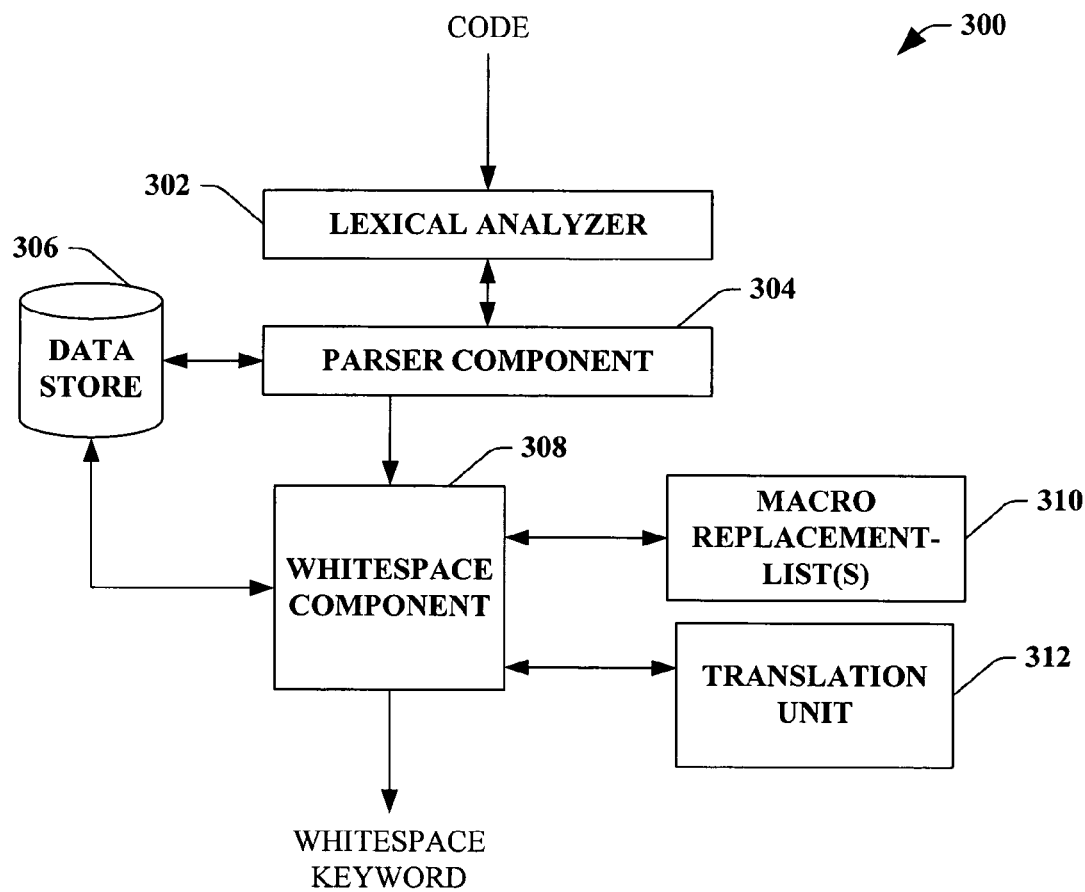
FIG. 3 illustrates a block diagram of an exemplary system that facilitates expanding an existing programming language in accordance with the subject invention.

FIG. 3 illustrates a system 300 that creates whitespace keywords facilitating expanding an existing computer programming language. A code is lexically analyzed by a lexical analyzer 302 (e.g., lexer). The lexical analyzer 302 reads the code and groups characters into tokens (e.g., lexical units with a collective meaning). Tokens are then parsed (e.g., splitting up continuous stream of characters) by a parse component 304. For example, the parse component 304 can utilize a parsing technique such as, but not limited to, top-down parsing, bottom-up parsing .... The parse component 304 is coupled to a data store 306, where parsed tokens from the code are stored. The data store 306, for example, can be computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the subject invention.

A whitespace component 308 creates a whitespace keyword based at least in part upon parsed tokens from the code (e.g., source code). By analyzing successively adjacent tokens in the code, whitespace component 308 creates a whitespace keyword by replacing the adjacent tokens with a single token when the two adjacent tokens reference a keyword. It is to be appreciated that the whitespace component 308 can create whitespace keywords from two identifiers and/or an identifier and an existing keyword. Moreover, the whitespace component 308 can create whitespace keywords for a plurality of existing code languages such as, but not limited to, C#, C, C++, Cobalt, Perl, Visual Basic, Python, PHP, Scheme, Ruby, ...

For example, a C++ Standard code can contain the line of code "int input." Tokens are generated, and code is parsed then stored. The tokens and parsing produce token1 as "int" and token2 as "input." A whitespace component 308 determines whether "token1 token2" is a keyword. Since "int input" is not a keyword within Common Language Runtime (CLR), the tokens are not replaced, and whitespace component 308 continues to search adjacent tokens within remaining code. In yet another example, code can be broken into tokens and parsed wherein token5 is "enum" and token6 is "struct." Whitespace component 308 determines whether "token5 token6" is a keyword within Common Language Runtime (CLR). Since "enum struct" is a keyword, whitespace component 308 replaces "token5" and "token6" with a single token "token5 token6," defined as a whitespace keyword. In this example, "enum" and "struct" are replaced with single token "enum::struct." The whitespace keywords can be utilized throughout the code in order to expand existing computer program languages.

Furthermore, whitespace component 308 replaces the two adjacent tokens referring to a keyword with a single token in a macro replacement-list 310 and a translation unit 312. The macro replacement-list 310 provides different definition of macros when updated, wherein a macro is a preprocessor feature that supports parameter substitution and expansion of commonly used code sequences. For example, a code can define a macro at one point, remove that definition and provide a different definition based at least in part upon macro replacement-list 310. It is to be appreciated that there can be more than one macro replacement-list 310 in which whitespace component 308 replaces adjacent tokens.

Code received by the system 300 allows a program to be compiled from code, wherein the program consists of one or more source files. Each source file contains some text of the program. A source file together with its included files (e.g., included using the #include preprocessor directive in C++ Standard) but not sections of code removed by conditional-compilation directives (e.g., #if) is called a translation unit. For example, source files are translated at different times and kept in either separate object files or in object-code libraries. These separate translation units are linked in order to form an executable program or a dynamic-link library (DLL). From a broader scope, translation units communicate using, for example, calls to functions that have external linkage, calls to member functions that have external linkage, direct modification of objects that have external linkage, direct modification of files, and interprocess communication.

By replacing two adjacent tokens with a single token in macro replacement-list 310 and translation unit 312, whitespace keywords can be utilized throughout the compiling and running process. Thus, whitespace keywords generated by whitespace component 308 can exist without "breaking" or violating existing programming language code. For example, when attempting to build upon C++ Standard code as in Common Language Runtime (CLR), C++ code can contain "for::each."Yet, "for" is a keyword within C++. However, utilizing whitespace component 308, "for::each" will replace the single tokens "for" and "each" allowing the whitespace keyword "for::each" to exist without conflicts in C++ Standard code.

Figure 4:
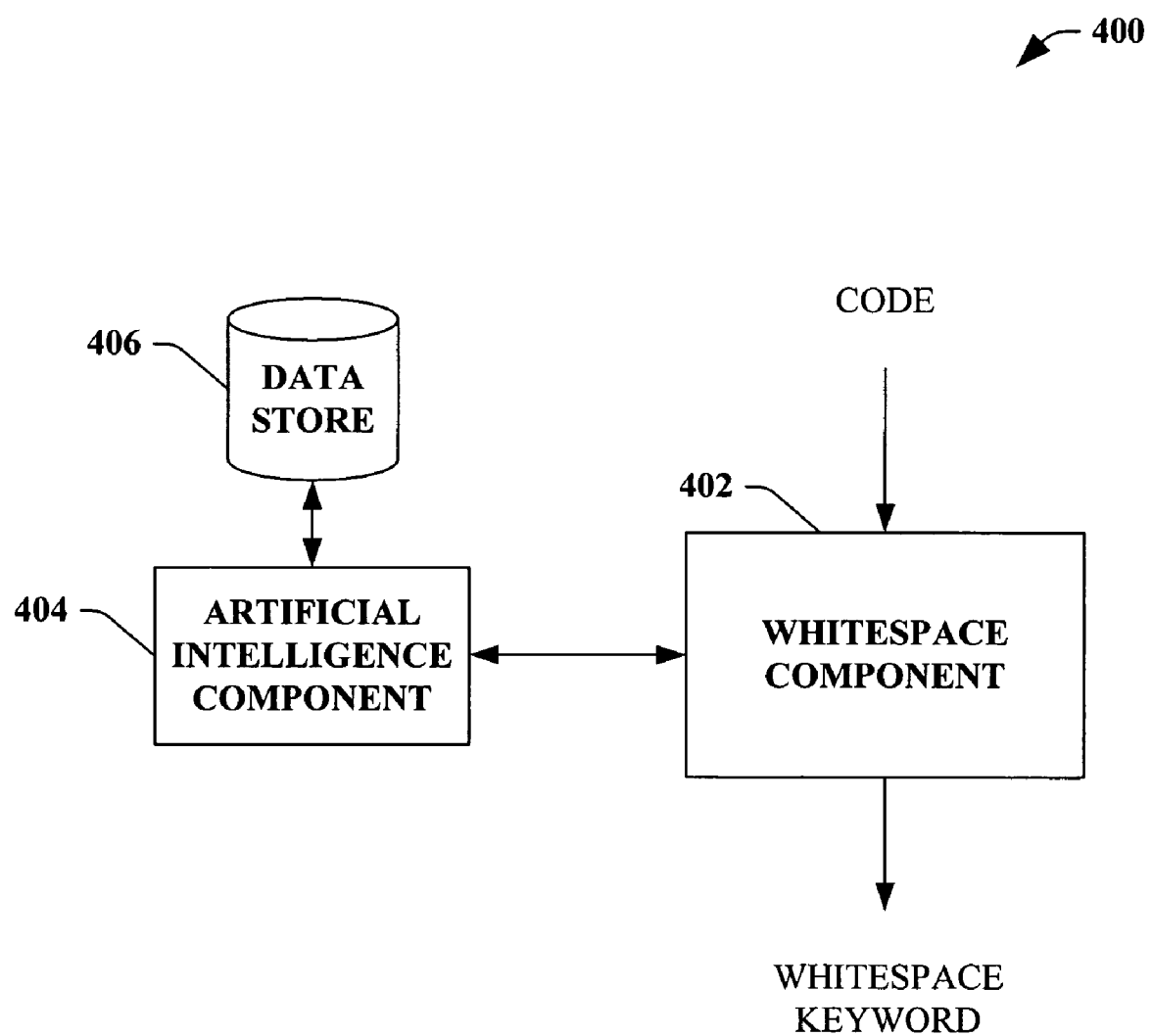
FIG. 4 illustrates a block diagram of a system that facilitates expanding an existing programming language in accordance with the subject invention.

FIG. 4 illustrates a system 400 that employs whitespace keywords to facilitate expanding an existing computer programming language wherein keywords are defined and conflict arises. The whitespace component 402 receives code that is to be compiled. The code can be, for example, C++ Standard, C, C#, Cobalt, Visual Basic, ... Once the code is broken into tokens and parsed, whitespace component 402 creates whitespace keywords based at least upon comparing adjacent tokens. If the adjacent tokens are a keyword, whitespace component 402 creates a whitespace keyword for the adjacent tokens wherein the whitespace is defined as an embedded white space (e.g., a space (::) or comments denoted by */ . . . */).

The system 400 further includes an artificial intelligence component 404 coupled to the whitespace component 402 employing inference techniques in order to facilitate creating whitespace keywords. The artificial intelligence component 404 infers computer programming language tendencies in order to facilitate the creation of whitespace keywords. Furthermore, the artificial intelligence component 404 stores profiles and historical data in a data store 406. The data store 306, for example, can be computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the subject invention.

In one aspect in accordance with the subject invention, user profiles and historical data are utilized in order to infer programming tendencies involving identifiers and computer programming language preferences. For example, a user profile can be utilized in order to tailor the creation of whitespace words to a specific programmer(s). The profile can contain a login, and a password allowing system 400 to distinguish one user from another.

For example, a programmer can utilize the system 400 including the artificial intelligence component 404 while programming within a computer program language. Based on variables such as, but not limited to, coding time, efficiency on compiling, length of code, complexity of code, . . . the artificial intelligence component 404 determines a suitable code and/or language to build upon. Once determined, the whitespace component 402 can create whitespace keywords based at least upon the language of preference.

Moreover, the artificial intelligence component 404 can infer keyword and identifier usage based at least in part upon historical data. For example, a programmer typically tries to be consistent and repetitive while programming a computer language in order to produce error-free code. Based on programming tendencies, the artificial intelligence component 404 can infer keyword and identifier usage within a determined programmable computer language of choice. It is to be appreciated the artificial intelligence component 404 utilizes training techniques in which the system 400 accumulates data regarding a user in order to specifically tailor whitespace keywords. For example, a probability threshold based on accumulated data can be established such that the artificial intelligence component 404 must surpass in order to infer whitespace keywords for the user.

In yet another aspect of the subject invention, the artificial intelligence component 404 can infer whitespace keywords for a user based at least upon uploading computer programming code. For example, the system 400 can be exposed to code samples of a user from which whitespace keywords can be inferred. In order to uphold the integrity of the artificial intelligence capabilities, code samples can be authenticated and specific to the user.

Figure 5:
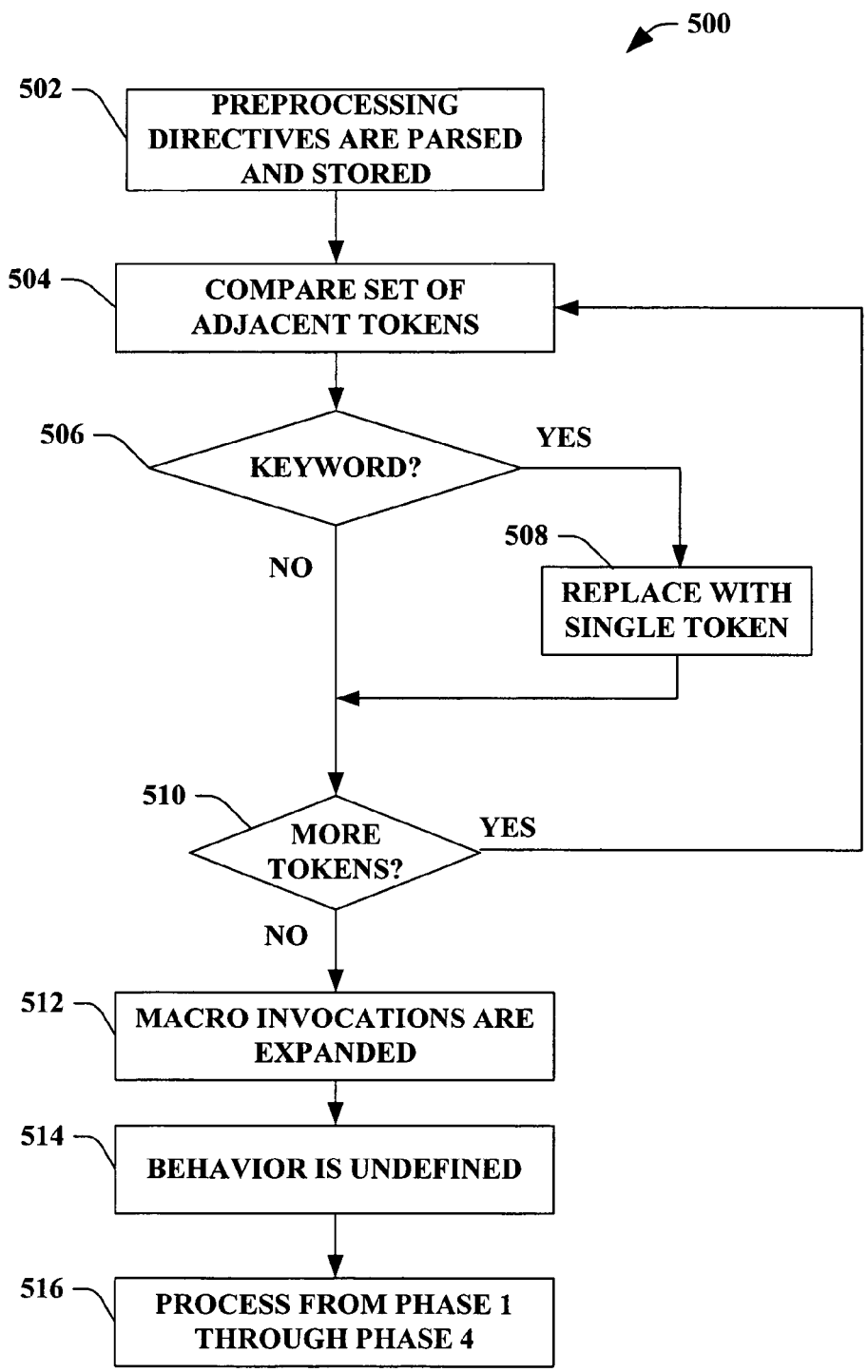
FIG. 5 illustrates a flow chart of an exemplary methodology that employs a whitespace keyword that facilitates expanding an existing programming language in accordance with an aspect of the subject invention.
Figure 6:
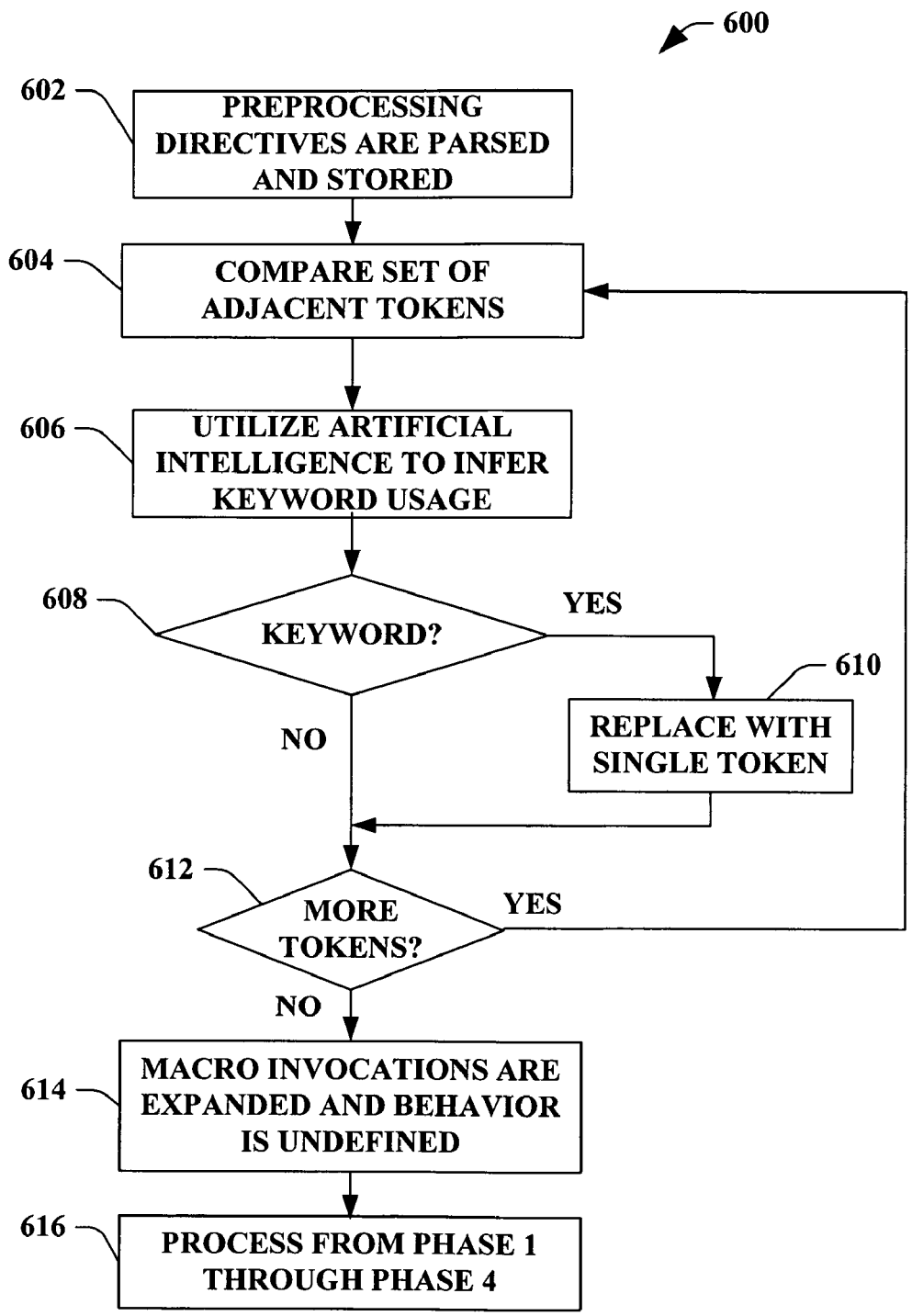
FIG. 6 illustrates a flow chart of an exemplary methodology that employs a whitespace keyword that facilitates expanding an existing programming language in accordance with an aspect of the subject invention
Figure 7:
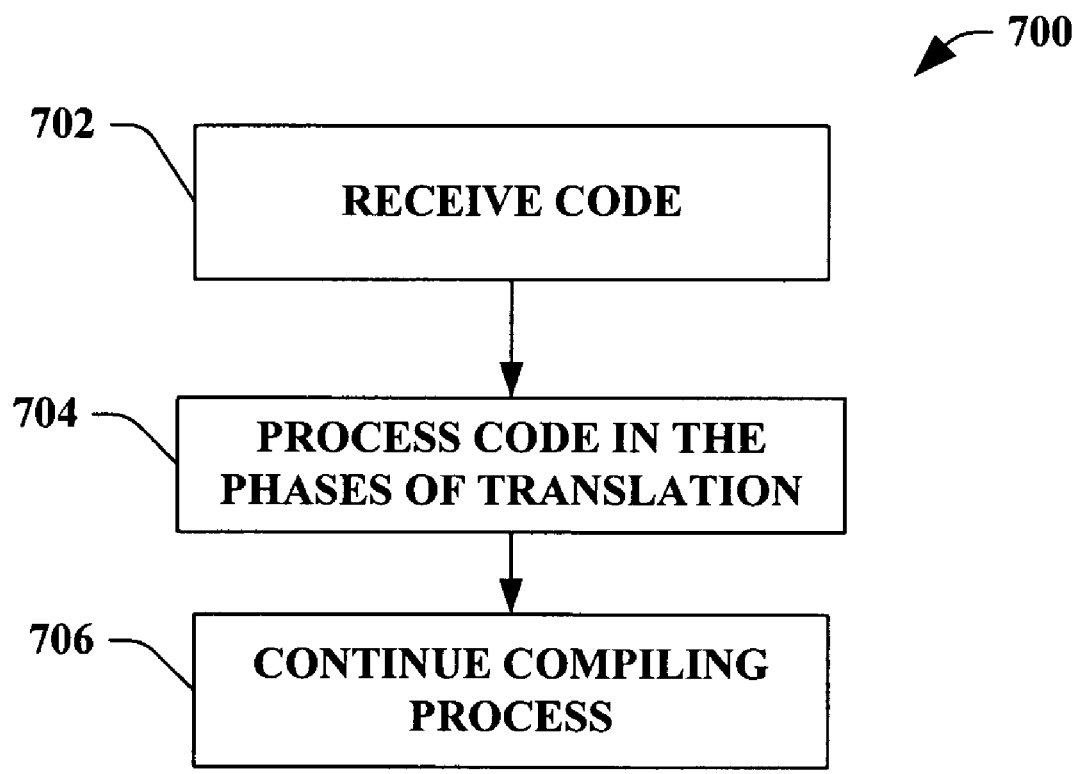
FIG. 7 illustrates a flow chart of a conventional phase of translation for computer programming language.

FIGS. 5-7 illustrate methodologies in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement the methodologies in accordance with the present invention. In addition, those skilled in the art will understand and appreciate that the methodologies could alternatively be represented as a series of interrelated states via a state diagram or events.

FIG. 5 illustrates a conventional methodology 500 that facilitates expanding an existing programming language by employing a whitespace keyword. For example, the existing programming language can be C++ Standard and the expansion can be within Common Language Runtime (CLR). In one aspect in accordance with the subject invention, translation phase 4 in the C++ Standard is extended. Starting at 502, preprocessing directives are parsed and stored. Next at 504, adjacent tokens are compared. From the tokens and parsed code, each token is compared adjacently to the next. In other words, each pair of adjacent tokens is successively considered. If the adjacent tokens are a keyword, the process continues at 508. However, if the adjacent tokens are not a keyword, the process continues at 510. If the adjacent tokens are a keyword, the two tokens are replaced in a translation unit and in each macro replacement-list with a single token containing embedded whitespace. For example, if two adjacent tokens, token1 and token 2, are successively considered. If "token1⋮token2" is a keyword, then token1 and token 2 are replaced with the single token, "token1⋮token2."

After replacing the adjacent tokens with a single lexical word containing whitespace (e.g., whitespace keyword), the process continues at 510. If there are more tokens within code at 510, the next successive adjacent pairs of tokens are compared at 504. It is to be appreciated that all tokens are compared within a code successively. If there are no more tokens to be examined, the process continues at 512 where macro invocations are expanded. Next, at 514, behavior is undefined. If a character sequence that matches syntax of a universal-character-name is produced by token concatenation, the behavior is undefined. Finally, at 516, the named header or source file is processed from phase 1 through phase 4. For example, within C++ Standard, a #include preprocessing directive can cause a named header or source file to be processed from phase 1 through phase 4, recursively.

FIG. 6 illustrates a conventional methodology 600 that includes inference capabilities to facilitate expanding an existing programming language utilizing a whitespace keyword. Within translation phase 4 in the C++ Standard, at 602 preprocessing directives are parsed and stored. Then, at 604 adjacent tokens are compared. Adjacent tokens within the code are successively considered. Next at 606, artificial intelligence is utilized to infer whitespace keyword application. For example, artificial intelligence infers a computer programming language of preference and tendencies in a specific programmer to facilitate creating whitespace keywords. Continuing at 608, the process determines if the two adjacent tokens are keywords. For example, the determination can be based in part upon the inference and/or if the two tokens are a keyword. If the two tokens are considered to be a keyword, the process continues at 610. At 610, adjacent tokens are replaced by a single token containing embedded whitespace. For example, starting with the first token, each pair of adjacent tokens, token1 and token2 is successively considered, and if "token1⋮token2" is a keyword, then token1 and token2 are replaced with a single token "token1⋮token2" in the translation unit and each macro replacement-list. After replacement with a single token, the process determines if there are more tokens at 612. If there are more tokens, the process continues by comparing the next pair of adjacent tokens at 604. If there are no more tokens within the code, the process continues at 614, where macro invocations are expanded. Furthermore, if a character sequence matches the syntax of a universal-character-name is produce by token concatenation, behavior is undefined. Lastly at 616, a #include preprocessing directive causes a named header or source file to be processed from phase through phase 4, recursively.

FIG. 7 illustrates a conventional methodology 700 that preprocesses code within phases of translation. C++ Standard code is received at 702. At 704, the code is processed in phases of translation within a compiler. Within the phases of translation, the following occur: character mapping, line splicing, tokenization, preprocessing, character-set mapping, string concatenation, translation, and linkage. The first four phases of translation are described in detail below.

Character mapping allows characters in code to be mapped to internal source representation. Trigraph sequences are converted into single-character internal representation. Line splicing joins all lines ending in a backslash (\) and immediately followed by a newline character with the next line in the code. This forms logical lines from physical lines. It is to be appreciated that code must end in a newline character that is not preceded by a backslash unless it is empty. During tokenization, code is broken into preprocessing tokens and whitespace characters. Comments are replaced with one space character each, and newline characters are retained. Within preprocessing, preprocessing directives are executed and macros are expanded into the source file. The #include statement invokes translation starting with the preceding three translation steps on included text. The conventional phases of translation do not incorporate any techniques to provide embedded whitespace into keywords. On the contrary, code is simply tokenized, parsed and executed. Thus, conventional techniques regarding phases of translation for C++ Standard code complicates expansion of an existing computer programming language.

Figure 8:
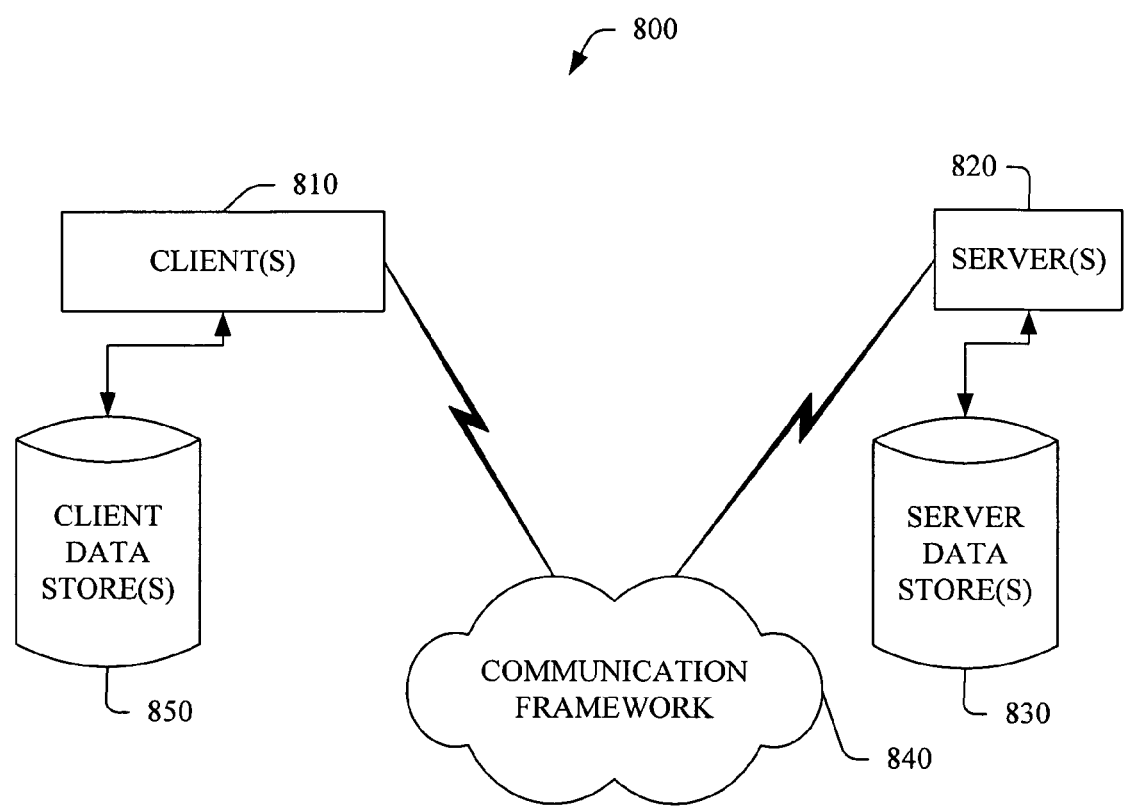
FIG. 8 illustrates an exemplary networking environment, wherein the novel aspects of the present invention can be employed.
Figure 9:
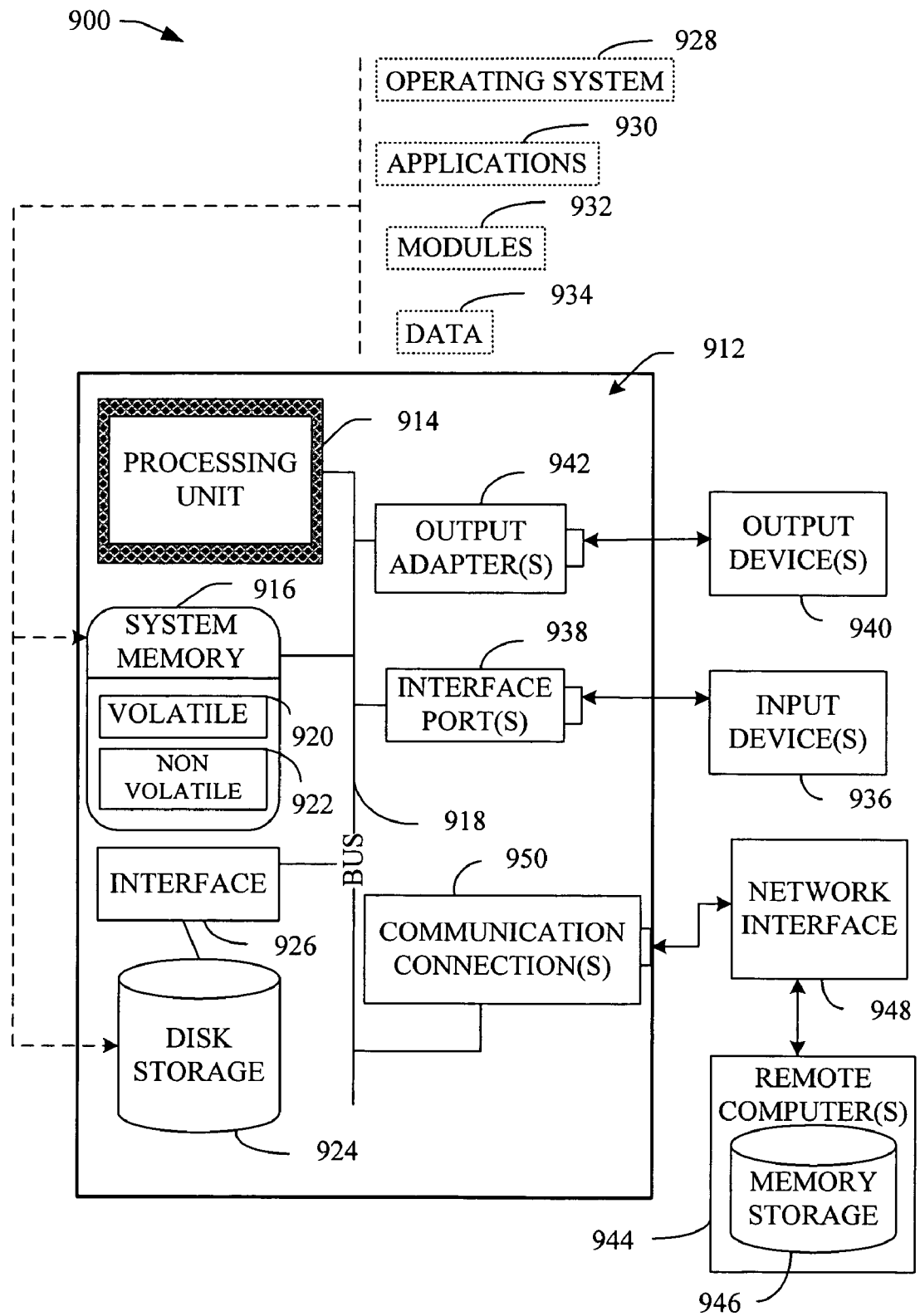
FIG. 9 illustrates an exemplary operating environment, wherein the novel aspects of the present invention can be employed.

In order to provide additional context for implementing various aspects of the present invention, FIGS. 8-9 and the following discussion is intended to provide a brief, general description of a suitable computing environment in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 8 is a schematic block diagram of a sample-computing environment 800 with which the present invention can interact. The system 800 includes one or more client(s) 810. The client(s) 810 can be hardware and/or software (e.g., threads, processes, computing devices). The system 800 also includes one or more server(s) 820. The server(s) 820 can be hardware and/or software (e.g., threads, processes, computing devices). The servers 820 can house threads to perform transformations by employing the present invention, for example.

One possible communication between a client 810 and a server 820 can be in the form of a data packet adapted to be transmitted between two or more computer processes. The system 800 includes a communication framework 840 that can be employed to facilitate communications between the client(s) 810 and the server(s) 820. The client(s) 810 are operably connected to one or more client data store(s) 850 that can be employed to store information local to the client(s) 810. Similarly, the server(s) 820 are operably connected to one or more server data store(s) 830 that can be employed to store information local to the servers 840.

With reference to FIG. 9, an exemplary environment 900 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in the suitable operating environment 900. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer implemented system with a memory that facilitates expanding keywords of an existing computer programming language within an expansion computer programming language, comprising the following computer executable components:
   a lexical analyzer that receives code and groups the code into tokens which are parsed;
   a whitespace component that creates a whitespace keyword based at least upon a successive comparison of a first adjacent token and a second adjacent token within the code and determining if adjacent tokens are a keyword in the expansion programming language, and replacing the adjacent tokens with the whitespace keyword, wherein the whitespace keyword contains a single token comprising the first and the second tokens with an embedded whitespace, and wherein the whitespace keyword replaces the first adjacent token and the second adjacent token in at least one macro replacement-list; and
   an artificial intelligence component that infers whitespace keyword usage based at least in part upon historic data and user profile.

2. The system of claim 1, wherein the code is C++ Standard extended into Common Language Runtime (CLR).

3. The system of claim 2, wherein the whitespace component creates the whitespace keyword during translation phase 4.

4. The system of claim 1, wherein the embedded whitespace is at least one of a comment string; and a space.

5. The system of claim 1, wherein the first adjacent token is an identifier and the second adjacent identifier is an existing keyword.

6. The system of claim 1, wherein the first adjacent token is an existing keyword and the second adjacent token is an identifier.

7. The system of claim 1, wherein the first adjacent token and the second adjacent token are identifiers.

8. The system of claim 1 further comprises a parser component that parses code utilizing at least one of a top-down parsing; a bottom-up parsing; a operator-procedure parsing; or a left-right parsing.

9. The system of claim 8, further comprises a data store storing parsed and tokenized code.

10. The system of claim 1, wherein the whitespace keyword replaces the first adjacent token and the second adjacent token in at least one translation unit.

11. A computer-implemented method that facilitates expanding keywords within an existing computer programming language, comprising:
   grouping code into tokens utilizing a lexical analyzer;
   parsing the code;
   comparing a first token and a second adjacent token successively, wherein comments within the code are equated to a single space;
   determining if adjacent tokens are a keyword; and
   creating a whitespace keyword by replacing the adjacent tokens with a single token comprising the first and second tokens and an embedded whitespace, wherein the whitespace keyword replaces the first adjacent token and the second adjacent token in at least one macro replacement-list; and
   inferring whitespace keyword usage based at least in part upon historic data and user profile by an artificial intelligence component.

12. The method of claim 11, wherein the code is C++ Standard expanded into Common Language Runtime (CLR).

13. The method of claim 12, further comprising creating the whitespace keyword during translation phase 4.

14. The method of claim 11, wherein the embedded whitespace is at least one of a comment string; or a space.

15. The method of claim 11, wherein the first adjacent token is an identifier and the second adjacent identifier is an existing keyword.

16. The method of claim 11, wherein the first adjacent token is an existing keyword and the second adjacent token is an identifier.

17. The method of claim 11, wherein the first adjacent token and the second adjacent token are identifiers.

18. The method of claim 11, further comprising parsing the code utilizing at least one of a top-down parsing; a bottom-up parsing; a operator-procedure parsing; or a left-right parsing.

19. The method of claim 18, further comprising storing the parsed and tokenized code in a data store.

20. The method of claim 11, further comprising replacing the first adjacent token and the second adjacent token with a whitespace keyword in at least one translation unit.

21. A computer readable medium storing computer executable components that facilitate expanding an existing computer programming language, comprising:
   a lexical analyzer component that receives a code, wherein the code is grouped into tokens;
   a parser component that parses the code; and
   a whitespace component that creates a whitespace keyword based at least upon a successive comparison of a first token and a second adjacent token within the code, to replace the adjacent tokens with the whitespace keyword if the adjacent tokens are determined to be a keyword in an expansion programming language, wherein the whitespace keyword contains a single token comprising the first and the second tokens and an embedded whitespace, and wherein the whitespace keyword replaces the first adjacent token and the second adjacent token in at least one macro replacement-list; and
   an artificial intelligence component that infers whitespace keyword usage based at least in part upon historic data and user profile.

* * * * *